US012783582B2

(12) United States Patent
Breitrueck et al.

(10) Patent No.: US 12,783,582 B2
(45) **Date of Patent: *Nov. 3, 2026**

(54) PROCESS MODELING BASED ON PROCESS INSIGHTS

(71) Applicant: SAP SE, Walldorf (DE)

(72) Inventors: Andreas Breitrueck, Walldorf (DE); Bastian Hoeltkemeier, Berlin (DE); Bernd Lauer, Walldorf (DE); Gregor Berg, Berlin (DE); Maximilian Hoelzig, Walldorf (DE); Stefan Voll, Stutensee-Spöck (DE); Zinayida Kensche, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/013,453

(22) Filed: Jan. 8, 2025

(65) Prior Publication Data

US 2025/0148012 A1 May 8, 2025

Related U.S. Application Data

(63) Continuation of application No. 18/312,717, filed on May 5, 2023, now Pat. No. 12,216,711.

(51) Int. Cl.
*G06F 7/00* (2006.01)
*G06F 16/00* (2019.01)
(Continued)

(52) U.S. Cl.
CPC .... *G06F 16/9024* (2019.01); *G06F 16/90335* (2019.01); *G06F 16/9038* (2019.01)

(58) Field of Classification Search
None
See application file for complete search history.

(56) References Cited

U.S. PATENT DOCUMENTS

| | | | | |
|---|---|---|---|---|
| 11,789,837 B1 * | 10/2023 | Jain | G16H 10/20 709/224 |
| 2011/0060627 A1 * | 3/2011 | Piersol | G06Q 30/02 705/26.7 |

(Continued)

OTHER PUBLICATIONS

892 Form dated Mar. 25, 2024 which was issued in connection with U.S. Appl. No. 18/312,717.

*Primary Examiner* — Tuan A Pham
(74) *Attorney, Agent, or Firm* — Buckley, Maschoff & Talwalkar LLC

(57) ABSTRACT

The example embodiments are directed to systems and methods which can generate a process graph with important process insights in a manner that is significantly faster and more scalable than related art approaches and answers questions most customers have through the use of standardization. In one example, a method may include querying a data store for document data of a process, identifying a plurality of milestones that occur within the process and blockers that prevent at least one of the milestones from completing based on the document data, generating a graph model of the process based on a predefined template, wherein the graph model comprises a plurality of nodes corresponding to the plurality of milestones and edges between the plurality of nodes based on the blockers, and displaying the graph model of the process via a user interface.

17 Claims, 11 Drawing Sheets

(51) Int. Cl.

| | |
|---|---|
| ***G06F 16/901*** | (2019.01) |
| ***G06F 16/903*** | (2019.01) |
| ***G06F 16/9038*** | (2019.01) |

(56) References Cited

U.S. PATENT DOCUMENTS

| | | | | |
|---|---|---|---|---|
| 2016/0011744 | A1* | 1/2016 | Roman | H04L 67/52<br>715/753 |
| 2017/0315979 | A1* | 11/2017 | Boucher | G06Q 10/101 |

* cited by examiner

FIG. 3B

350

| Request ID (351) | Item ID (352) | Doc Type (353) | Sales Date (354) | Purchaser ID (355) | Invoice Date (356) | ... |
|---|---|---|---|---|---|---|
| 102795 (360) | 678 | Order | 1/03/2023 | Org A | 1/07/2023 | ... |
| 102798 | 1482 | Invoice | 1/04/2023 | Org B | 1/13/2023 | ... |
| 102809 | 403 | Order | 1/04/2023 | Org C | 1/09/2023 | ... |
| 102822 | 3234 | Order | 1/06/2023 | Org C | 1/14/2023 | ... |
| 102856 | 1679 | Receipt | 1/06/2023 | Org D | 1/17/2023 | ... |
| ... | ... | ... | ... | ... | ... | |
| ... | ... | ... | ... | ... | ... | |

400

| ID (401) | Currency (402) | Customer ID (403) | Activity (404) | Date (405) | ... |
|---|---|---|---|---|---|
| 102795 (361) | EUR | Org A | Created | 1/07/2023 | ... |
| 102795 (362) | EUR | Org A | Shipped | 1/11/2023 | ... |
| 102795 (363) | EUR | Org A | Paid | 1/19/2023 | ... |
| 102798 | US | Org B | Created | 1/12/2023 | ... |
| 102798 | US | Org B | Shipped | 1/17/2023 | ... |
| ... | ... | ... | ... | ... | ... |
| ... | ... | ... | ... | ... | |

FIG. 4
(Event Log)

600A

600B

PROCESS MODELING BASED ON PROCESS INSIGHTS

BACKGROUND

Many organizations rely on software to run their business such as enterprise resource planning (ERP) software. ERP helps companies create and track orders, generate and clear invoices, receive payments, interact with a website, and the like. ERP software also offers opportunities to perform process mining on the business process. Process mining is a technique that provides insight about a business process to an organization. In many cases, process mining includes executing algorithms on log data from a runtime environment of the business process to identify trends, patterns, variants and other details of the process and how it unfolds. However, process mining usually involves customization of analyses provided by process mining vendors which mine the business process including building dashboards and other software which can take weeks of time. Furthermore, process mining relies on hard-to-find expertise (i.e., domain experts) in the field of software engineering and business process analysis. Such an endeavor can be quite costly which is why customers tend to focus on only smaller parts of the process rather than focusing on a holistic overview of the complete process landscape.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3B is a diagram illustrating a data set resulting from generating the milestones and blockers shown in FIG. 3B, in accordance with example embodiments.

FIG. 4 is a diagram illustrating an example of an event log that can be generated from the data set shown in FIG. 3B, in accordance with example embodiments.

Figure 1:
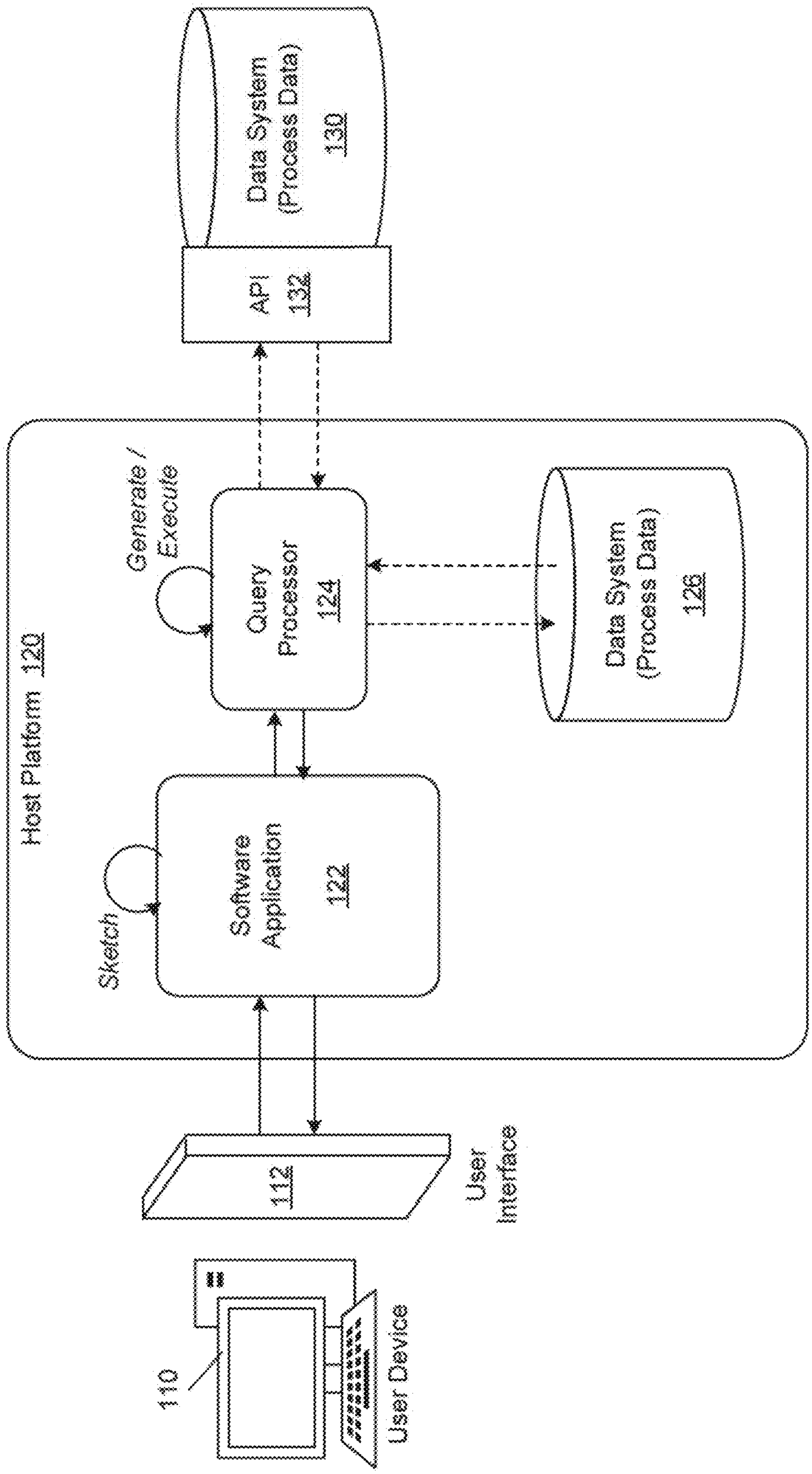
FIG. 1 is a diagram illustrating a process of executing a query and generating process insights in accordance with example embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Insights into a core business process can help an organization plan, monitor, and evaluate any meaningful changes to their process. Insights often include mapping out different variants of a given process, which is a prerequisite for synchronising execution across an organization, and for reducing administrative overhead and cost. Related approaches to understanding such insights are derived using process mining. A realistic timeline for performing such process mining is a few months and it requires process mining vendors that are familiar with the software system being mined. The vendors typically build dashboards and logic for mining the process which requires significant manual development and work. The result is significant time and costs being consumed. Another drawback is that process mining may "mine" the entire state space of the software which ultimately leads to a brief overview of the entire process being generated without much detailed insight. Furthermore, once a mining project is complete, the data can continue to be monitored, but the data extraction can no longer be modified in an easy manner. As a result, if a mining project should be extended into other parts of the process, a completely new mining project will need to be created.

The example embodiments are directed to a software system (also described herein as a host system) that provides a suite of software (also referred to herein as a transformation suite) that can gather insights across a whole process landscape of a business process and transform the insights into a process mining result (e.g., a process graph) in less than one hour and with little to no interaction from domain experts. The system can analyze the process insights for events that occur during the process and build an event log from the insights. The event log can be used to generate the process graph. For example, events in the event log can be mapped to steps/nodes in the process graph. Further, an order among the steps can be identified and edges (directional arrows) can be added in between the nodes to show the "flow" of data among the steps of the process. The process graph can then be verified and compared to best practice models to determine how well the process "fits" with the current best practices of the industry. The system may output a view of the results of the analysis.

This is a significant improvement in the art of process mining. In the example embodiments, a milestone represents an event that occurs within the business process which should always take place within the process, regardless of its manifestation in a specific enterprise software system. For example, a business process that involves the sale of goods may include a requirement that a sales order (document) be created which identifies the goods and a requirement that an invoice (document) be generated and cleared. These three actions can be considered milestones. For example, the first milestone may be "creating a sales order", a second milestone may be "creating an invoice", and a third milestone may be "clearing the invoice".

Meanwhile, blockers are occurrences or events that block the process from moving forward and will usually remain in place until the block is removed, if they don't directly terminate the process instance (e.g., the manual cancelation of an order). Referring again to the example of the three milestones above, the process may require that the buyer sign and return the sales order before the invoice can be generated by the system. In this example, failure to receive a signed sales order may be considered a blocker to the process. Until the signed sales order is received, the block will remain in place. Other contextual information reflecting such as unwanted or unintentional behavior (e.g. wrong sequence of process steps) can also be covered in such a definition of a blocker to surface these issues to the people responsible of running the process.

Such standardized milestones and blockers have been and can be identified from years of expertise in the field of process insights and avoid unnecessary mining projects which attempt to mine the entire state space of the process including parts of the process that are unrelated to the ultimate success of the process. While process mining can give you the whole state space including all irrelevant variants, paths and events, the example embodiments focus on identifying the standard blockers typically encountered by most businesses. From a commercial perspective, the customer does not have to decide on one process to understand in depth but can get insights into challenges and blockers in a standardized way across the whole process landscape. The software system may provide pages of user interfaces which enable users to choose or otherwise select a subset of milestones from the predefined/standardized list and a subset of blockers for each milestone from another predefined/standardized list.

The data for identifying the insights can be extracted from process data stored in an underlying data store/database, for example, sales data, sales orders, invoices, payment transactions, account summaries, and the like, which can be used to see how the process is performing. To do this, the host system may query the process data and generate insights according based on milestones and blockers using the systems and methods described in U.S. patent application Ser. No. 18/118,857, filed on Mar. 13, 2023, in the United States Patent and Trademark Office, the entire disclosure of which is fully incorporated herein by reference for all purposes. The example embodiments may be an extension of the systems and methods described in U.S. patent application Ser. No. 18/118,857. For example, the host system may analyze process data of a software program, recognize standard milestones and blockers within the process, and create insights based on how the process performs with respect to those standard milestones and blockers.

In some embodiments, the process insights (e.g., fast insights, etc.) may be stored in a table or other data structure that can be analyzed by the host system to identify a list of events that occur during the process. Details of the events may be recorded in an event log such as a table or other structure. This may be performed for the milestones and blockers which are of relevance. For a process instance such as a Sales Order with a specific ID, the host system may have access to different state changes of the specific sales orders. For example, in FIG. 3B, for each sales order, the table also contains dates such as "Sales Date" and "Invoice Date". By taking the data in these tables and adding a semantic meaning based on the milestone or blocker definition, a dedicated event can be constructed in a generic way which suitably describes the process running for all customers. Such an event refers to the underlying business object by its ID, contains the date when the specific change occurred, and a human readable semantic description of what happened. Examples of the later could be the aforementioned "create an invoice" or "clear an invoice."

Furthermore, the host system can insert "virtual" events into the event log which are not directly identified from the insights, but which can be inferred from the other events that are found in the event log. The event log may include enough detail to build a process graph using existing mining process algorithms. For example, the event log can be processed by any of the available mining algorithms used to generate process graphs from event logs. This is essentially done by analyzing the sequences of events (or steps) the different cases go through, clustering the activities (i.e. nodes) they have in common and overlaying all cases onto each other. This allows the creation of a process graph, providing quantitative insights into how many cases follow which path through the graph as well as qualitative analyses to figure out conditional paths and how to avoid these. The resulting process graph may include a plurality of nodes that represent the plurality of milestones of the process, and/or other events that occur within the process. The nodes may include edges therebetween which illustrate the "flow" of the process between the milestones.

The host system may analyze the process graph to provide the customer with intelligence associated with their process. For example, the host system may identify performance attributes of the process over time including what percentage of process instances reach each milestone, what percentage of instances follow different paths within the process graph, how long which transition takes on average on each path, an order among the different steps in the process, and the like.

The example embodiments provide a number of advantages with respect to current insight generating techniques such as process mining. For example, the software system may utilize document data and other historical process data for a given system to identify milestones and blockers of a process. Using predefined/standardized milestones and blockers, the system can then build a process mining graph of the process from the milestones and blockers in a fraction of the time that it would take to perform actual process mining. The speed is ensured by standardizing the scope of the analysis to critical areas (milestones and blockers) including steps of the process with low efficiency, significant defects, and, generally speaking, where the process is losing/bleeding money. Additionally, the standardization allows the application of this approach across the whole process landscape, ensuring highly relevant results for all customers in most of the processes covered.

FIG. 1 illustrates a computing environment 100 of a host platform 120 for generating process insights in accordance with an example embodiment. Referring to FIG. 1, the host platform 120 may be a cloud platform, a web server, a database, a combination of devices, and the like. The host platform 120 hosts a software application 122 for generating process insights. The software application may include one or more analytic programs that can analyze a business process and generate insights for a business process. The data used by the software application 122 to generate process insights is stored in a data system, for example, data system 126 that is local to the host platform and/or data system 130 that is external to the host platform 120 and that is accessible via a network such as the Internet. As described herein, a data system may refer to a database, a website, a data service, a blockchain, or the like. In this example, the data system 126 may be accessed via an API and/or it may be accessed via a query such as a SQL query, or the like. One or more of the data system 126 and the data system 130 may contain process data of a business process such as a process included in another software application, which is not shown. The software application 122 may analyze the business process to generate fast insights and build a process graph for the entire process landscape in just a short amount of time.

In this example, a user such as a process expert may interact with the software application 122 via a user device 110 such as a laptop computer, a mobile device, a desktop computer, a server, and the like. For example, the user may use the user device 110 to connect to a website, uniform resource locator (URL), or other location where the software application 122 is hosted. In some examples, the software application 122 is a progressive web application, a mobile application, or the like. In some embodiments, the software application 122 is actually a suite of multiple applications. The software application 122 may include a front-end with a user interface 112 that is output on a screen/display of the user device 110 once a session is established between the user device 110 and the host platform 120.

According to various embodiments, the user may select a system where the process data is located from among the data system 126 and the data system 130. While both the data system 126 and the data system 130 are shown in this example, the process data may only be stored in one of these data systems. In this example, the process data is stored in the the data system 130 which is accessed via an application programming interface (API) such as API 132. The software application 122 may output guidance for the user via the user interface 112 to assist the user in selecting the correct system. A schema of the selected system may be uploaded to the software application 122 via the user interface 112. For example, the user may upload a file, a document a spreadsheet, or the like which includes the schema information.

The software application 122 may also provide various user interfaces which enable the user to define milestones within the process and blockers for those milestones. The user interfaces may be accessible via a same page of the software application 122 or across multiple different pages of the software application 122. The user may also define a script or other instructions with query commands for querying the data necessary for analyzing the milestones and blocker(s) of the milestone via the user interface. Each blocker may have its own query, for example, a structured query language (SQL) query, or the like. The software application 122 may provide user interfaces and standardized lists of milestones and blockers (e.g., via drop-down menus, etc.) that the user can select from. Furthermore, software application 122 may also provide support and assistance in developing queries for accessing the data from the underlying data system.

When all queries for all blockers have been generated, the software application 122 may create a single script, API call, etc., which can be executed by a query processor 124 on the selected data system to extract the process data of the business process (not shown) necessary for analyzing each of the blockers via a single command. For example, the software application 122 may generate a structured query language (SQL) query for each of the blockers and then create a single script which extracts a union of all of the fields necessary from the data system for analyzing the business process. In some embodiments, the data system may also include an API, such as data system 130 which includes an API 132. In this example, the query generated by the software application 122 may include query commands and/or API calls for extracting the process data from the data system 130.

The generated script, query, etc. may be stored by the software application 122 and accessed by the user via the user device 110 or any other user with access to the process data via the software application 122. Here, the user may provide an identifier of the process (e.g., a process ID, etc.). In response, the software application 122 may query the selected data system based on the previously generated query corresponding to the process ID, and execute an analytic(s) on the process data to generate process insights which can be displayed on the user interface 112. The process insights may include identifiers of milestones within the process and any blockers associated with the milestones. In addition, the insights may include context associated with the milestones and blockers such as how many users/customers are affected by the blockers, how many customers/users fail to finish the process, where customers are getting stuck in the process, and the like.

The process data that is pulled/extracted from the data systems 126 and 130 may include values of table data that are queried from tables stored in therein including order data, invoice data, payment data, shipping data, transportation data, inventory data, and the like. Through this data, the software application 122 can analyze the process data to identify insights associated with the process. For example, the software application 122 may identify how long it takes for each milestone to be reached (e.g., the amount of time that elapses between milestones) and the blockers that block these milestones from being achieved. To identify the duration between milestones, the software application 122 may use timestamps of when the process enters the two respective milestones on average and subtract the two.

In addition to identifications of the milestones and blockers of the process, the insights may also include an amount of elapsed time on average between the milestones, the number of processes that make it to each milestone, how each blocker affects the achievement of milestones within the process, and the like.

Figure 2:
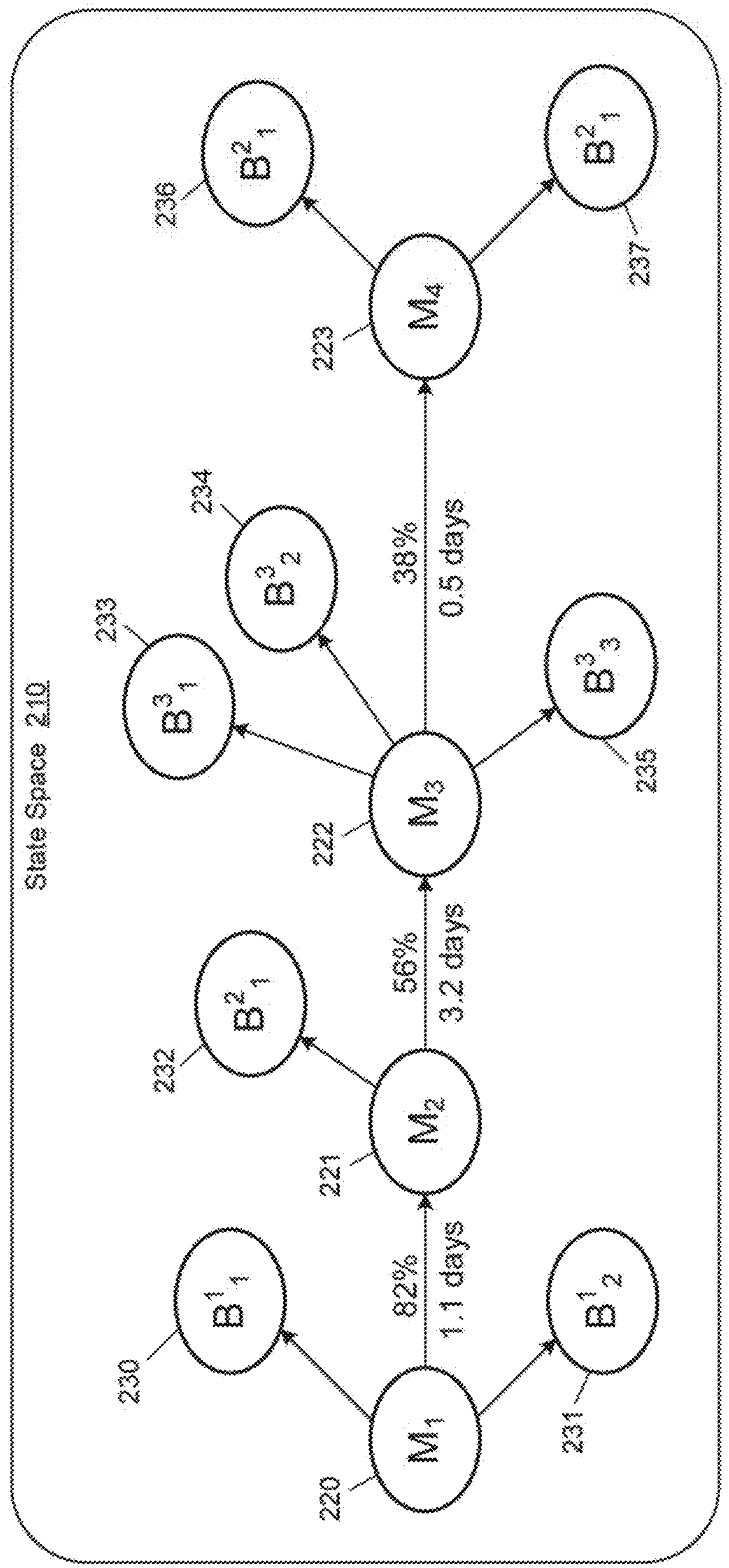
FIG. 2 is a diagram illustrating a view of a state space of a process including milestones and blockers within the process in accordance with example embodiments.

FIG. 2 illustrates a view 200 of a state space 210 of a process including milestones and blockers within the process in accordance with example embodiments. Referring to FIG. 2, the entire process space of a business process is shown as state space 210. The example embodiments restrict the size of the state space 210 based on predefined events in the process including a plurality of milestones 220, 221, 222, and 223, and a plurality of blockers 230, 231, 232, 233, 234, 235, 236 and 237 for the plurality of milestones 220, 221, 222, and 223. In this example, a blocker 230 is a blocker for milestone 220 within the process. Each milestone may have its own respective blockers or it may not. For example, each milestone may include zero blockers, one blocker, more than one blocker, and/or the like. In this way, the process is only analyzed based on the key areas of the process associated with milestones (e.g., document creation, document submission, document clearing, etc.) instead of the entire state space which can take significantly more time.

Figure 3A:
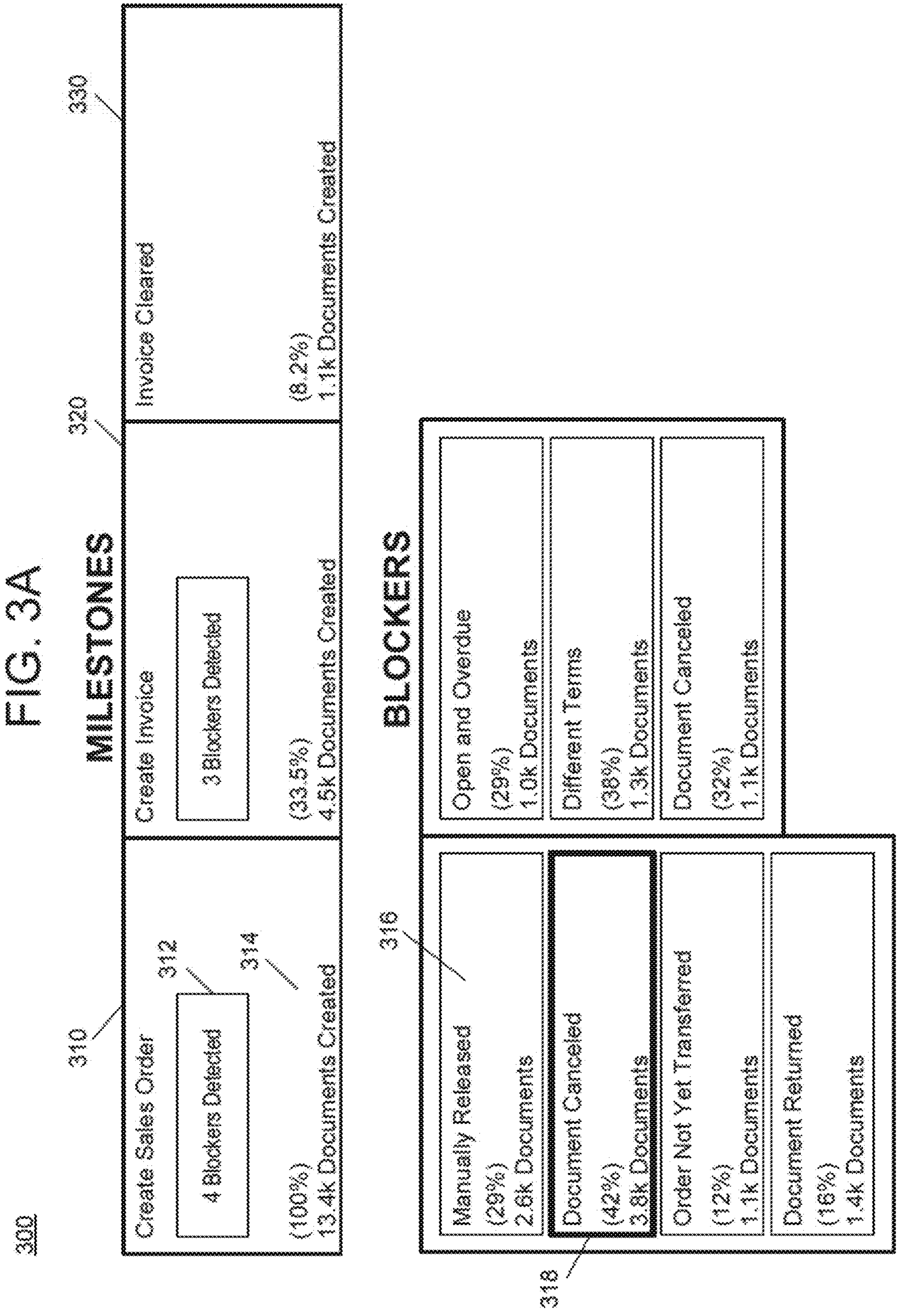
FIG. 3A is a diagram illustrating a user interface with examples of milestones and blockers within a process, in accordance with example embodiments.

FIG. 3A illustrates a user interface 300 which includes identifiers of milestones and the blockers shown in FIG. 2, in accordance with example embodiments. Referring to FIG. 3A, the user interface 300 includes a display of insights including a plurality of milestones 310, 320, and 330, and attributes of the milestones including a number of blockers 312 that are detected and attributes 314 of the milestone with respect to other milestones. In this example, the milestones 310, 320, and 330 are executed in sequence within the end-to-end business process and each involve a document. In some cases, each milestone may correspond to documents involved in the process.

In this example, milestone 310 represents a step of generating a sales order, milestone 320 represents a step of generating an invoice based on the sales order, and milestone 330 represents clearing the invoice (based on successful payment). The milestone 310 includes four blockers which are show below the milestone 310 including a blocker 316 directed to manually released documents. Other blockers including cancellation of documents, not transferring an order to the invoicing department, returning the sales order for errors, and the like. To assist the user in understanding the issues, the host system can display an identifier of the number of blockers 312 within the milestone 310, and also attributes 314 of the milestone 310 inside a content area of the graphical object of the milestone 310 on the user interface 300.

In addition to identifying the amount of time and the attributes of the milestones and the blockers, the host system (e.g., software application 122, etc.) may distinguish different graphical objects on the screen. As an example the host system may highlight an object with a bold line 318 to identify this blocker as something that needs to be addressed more urgently as it is causing a lot of loss within the process. Thus, the system can identify a priority among the different blockers and display visual indicators of such priority or arrange the display of the blockers in an order based on the priority, etc. This priority is based on thresholds the process experts provided based on their experience for what is considered good or bad for the process execution when they defined the blockers.

In some embodiments, each milestone may be associated with a document that is involved in the process such as an order, an invoice, a financial document, or the like. The blockers may refer to actions or other events/items within the process that block or otherwise prevent the milestone (e.g., the document) from being completed in some way such as incorrect content, not yet submitted, submitted and returned, canceled, etc. Furthermore, each of the milestones 310, 320, and 330, may be visualized along with a number of documents generated for each milestone and the percentage or ratio of such documents that compete the milestone. For example, in FIG. 3A, the milestone 310 includes 13,400 documents (sales orders) being created, but only 4500 of the documents were eventually converted into invoices in the milestone 320. This corresponds to a loss ratio of about 66.6%. These insights can be provided to the user via the user interface 300.

FIG. 3B illustrates a data set 350 resulting from generating the process insights in FIG. 1, in accordance with example embodiments. The data set 350 may include a record of a particular item/product that is purchased via the process. Here, the data set 350 includes a plurality of columns 351, 352, 353, 354, 355, 356, etc., as well as columns not shown which can be analyzed by the host system to generate a log of events that have occurred within the process. In other words, the host system can analyze the data stored in the data set 350 which may include document data from the underlying database/data system, and generate a listing of events that have occurred within a process.

FIG. 4 illustrates an example of an event log 400 that can be generated from the data set 350 shown in FIG. 3B. Referring to FIG. 4, the event log 400 includes a plurality of columns of data values including columns 401, 402, 403, 404, 405, and the like. In this example, the event log 400 includes multiple events (e.g., three events, four events, etc.) which have been interpreted from each record shown in FIG. 3B. For example, a first record 360 shown in FIG. 3B includes three events 361, 362, and 363 in the event log 400 in FIG. 4. The events 361, 362, and 363 may be identified from within the same record using timestamps of the events which are stored in the record. For example, each timestamp may be paired with an action (e.g., invoice creation, etc.). The host system may analyze the records in the data set 350 and interpret the records to generate events which are added to the event log 400.

The events may include actions that occur within the process including creating a sales order, shipping the item to the customer, receiving payment for the item from the customer, etc. In many cases, the events may correspond to the milestones and/or the blockers already identified. The host system may identify the events within the event log 400 and pair the events with a corresponding timestamp from the record to generate a log entry in the event log 400. In other words, the host system may pair activities identified from the insight data with timestamps found in the insight data to generate an activity definition that can be analyzed for additional process insights. The process may be performed by an executable script creating one event log per standardized milestones definition of the process. Accordingly, the creation of the script generating standardized event logs such the event log 400 based on standardized inputs such as the data set 350 is a one-time effort. The time it takes the script to complete execution is based on the amount of data to process. Furthermore, state-of-the-art process mining solutions can display first process graphs within minutes.

For example, the event log 400 can be used to build a process graph of the process. For example, the process graph may be similar in appearance as a process graph created from traditional process mining. However, in this case, historical data (e.g., document data, etc.) is used to mine the process without requiring users to interact with or to customize a mining approach.

Figure 5A:
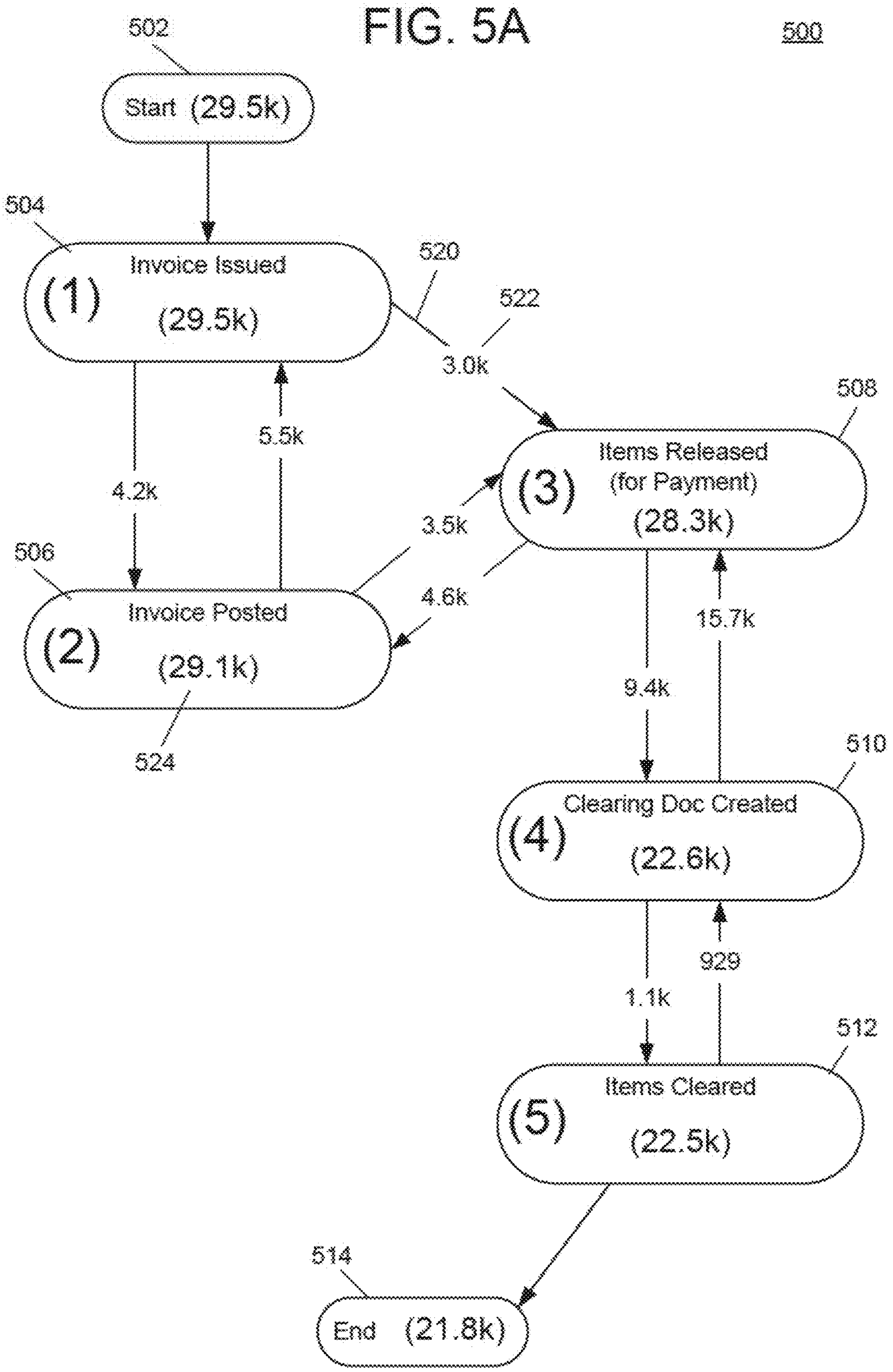
FIGS. 5A-5B are diagrams illustrating graph models of a process that are generated based on the event log shown in FIG. 4, in accordance with example embodiments.
Figure 5B:
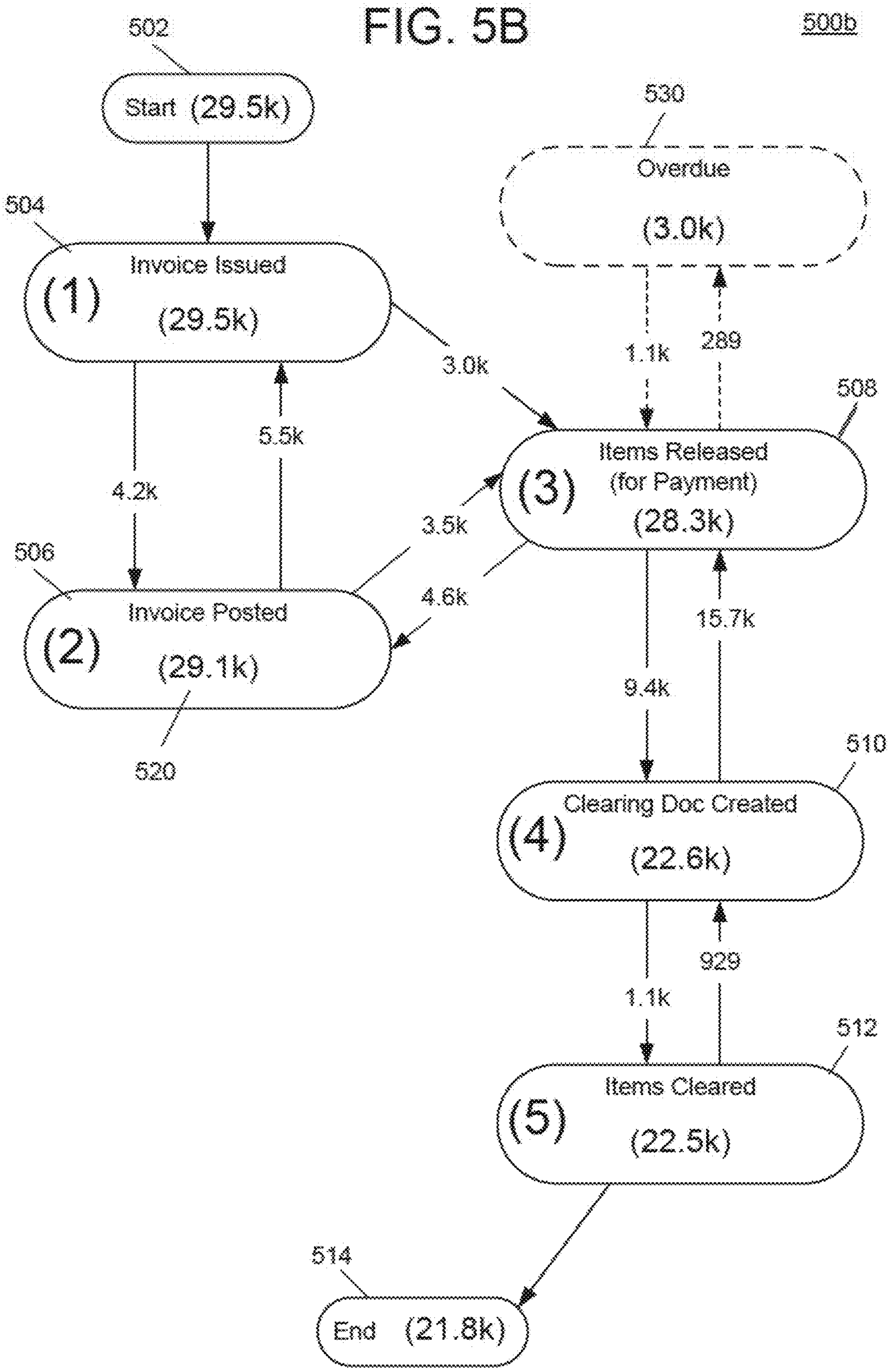

FIGS. 5A and 5B illustrate examples of graph models of a process that may be generated by the host system described herein based on the event log shown in FIG. 4, in accordance with example embodiments. Referring to FIG. 5A, the events stored in the event log 400 may be used to build a process graph 500 of the process. For example, the process graph may be similar in appearance as a process graph created from process mining. However, in this case, historical data (e.g., document data, etc.) is used to mine the process without interacting with the process during its live runtime/execution.

In the example of FIG. 5A, the event log 400 can be processed via one or more known process mining algorithms which converts the events from the event log 400 into the process graph 500 with a plurality of nodes 502, 504, 506, 508, 510, 512, and 514, along with directional edges 520 in between the nodes which provide a “flow” of the process in between the nodes/milestones in the graph. In addition, the direction edges may include context 522 with information about the number of cases (i.e. process instances) that follow each link/path in the process graph 500. Furthermore, completion data 524 may be illustrated within the process graph 500 and may identify how many (e.g., what ratio, etc,) of cases make it to each point/node in the process graph 500. These insights can help a process expert to better understand where the customers are getting stuck in their process and where they are doing just fine. Furthermore, many of the nodes include reverse flows (directional edges going the other way) to previous nodes representing users that had to return to previous steps in the process due to issues and other errors.

Additionally, virtual events can be constructed wherever necessary. For example, referring to FIG. 5B, the process mining algorithm may identify that after an invoice is created on, e.g., on a creation date with a due data specified in the record, this may not be identified as an event by thee algorithm if no activity occurs automatically. However, if the invoice is only paid after being due, a virtual event 530 can be constructed as shown in the modified process graph 500*b* in FIG. 5B. Here, the virtual event corresponds to an "overdue" event which is constructed on its due date to ensure that this variant is emphasized in the process graph of the event log. The overdue event occurs because of a failure to perform a standardized event/milestone.

When the process graph is finished, the host system may select the as-is process graph and analyze it for additional insights. For example, a process graph may be exported into a process manager which converts the as-is process graph into a Business Process Model and Notation (BPMN) model which is a standard for business process modeling. For example, the BPMN model can provide a graphical notation for specifying business processes in a Business Process Diagram (BPD) based on a flowcharting technique very similar to activity diagrams from Unified Modeling Language (UML). The objective of BPMN is to support business process management, for both technical users and business users, by providing a notation that is intuitive to business users, yet able to represent complex process semantics. The BPMN specification also provides a mapping between the graphics of the notation and the underlying constructs of execution languages, particularly Business Process Execution Language (BPEL).

BPMN models are expressed by simple diagrams constructed from a limited set of graphical elements. For both business users and developers, they simplify understanding of business activities' flow and process. BPMN's four basic element categories are Flow objects (e.g., events, activities, gateways, etc.), connecting objects (e.g., sequence flow, message flow, association, etc.), swim lanes (e.g., pool, lane, dark pool, etc.), and artifacts (e.g., data object, group annotation, etc.). These four categories enable creation of simple business process diagrams (BPDs). BPDs also permit making new types of flow object or artifact, to make the diagram more understandable.

Furthermore, the process graphs may be processed based on thresholds which are used to ensure the most relevant process variants are exported. For example, a process may include the following events (event A=created, event B=shipped, and event C=paid) which are observed in all permutations. Here simply constructing a graph diagram of such a process would result in a rather trivial graph/diagram which would not lead to insights about how the process is run. However, if the event sequence A, B, C makes up only 5% of the process runs while the event sequence A, C, B makes up 95% of all paths, a diagram showing these two variance is relevant and specific for the process and its owner/developer. This generation ensures traceability via identifiers (e.g., event type references for activities in process models, etc.) This also allows the host system to be used to automatically add live insights (e.g., KPI values) from process insights or other intelligence to the corresponding activities in the process models.

Figure 6A:
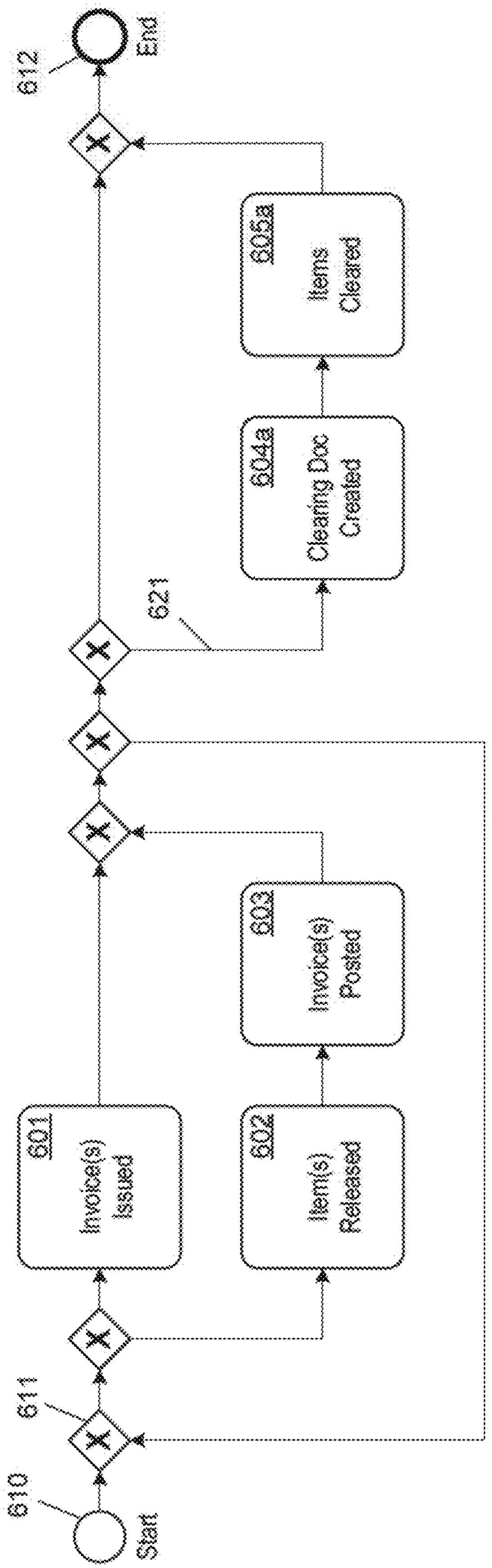
FIG. 6A is a diagram illustrating a BPMN model that is generated from an "as-is" process graph in accordance with example embodiments.

FIG. 6A illustrates a BPMN model 600A that is generated from an "as-is" process graph in accordance with example embodiments. Referring to FIG. 6A, the BPMN model includes node 601, 602, 603, 604*a*, and 605*a*, representing the events in the model. In this example, nodes 604*a* and 605*a* correspond to clearing of invoices which is a required part of the process. However, in the as-is model shown in FIG. 6A, the nodes are on an optional path 621 in the process. This is not best practice. In addition, the BPMN model 600A also includes a start node 610, an end node 612, and a plurality of exclusive gateways 611. The nodes and the gateways may be interconnected via directional edges within the diagram which provide a direction of flow within the process. The BPMN model 600A may be output via a user interface such as a GUI that is part of a front-end of the software application 122 shown in FIG. 1.

Figure 6B:
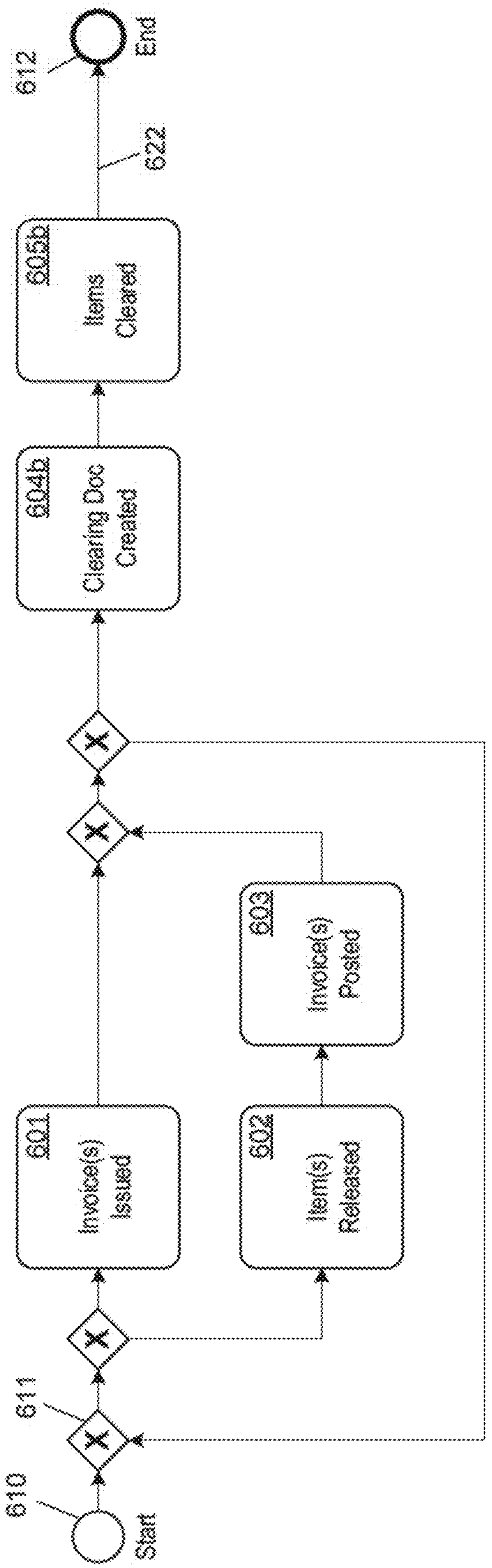
FIG. 6B is a diagram illustrating a process of fitting the BPMN model in FIG. 6A to a best practice model in accordance with example embodiments.

The host system described herein may identify a best practice model that is similar to the as-is process model generated in FIG. 6A, and compare the as-is process model to the best practice model to identify changes. For example, the host system may try to fit the as-is process model onto the best-practice model. The fitting process may detect what changes need to be made to the as-is process graph to align with the best practice model. For example, in FIG. 6B, the host system has generated a modified BPMN model 600B in which the clearing steps noted in nodes 604*a* and 605*a* have been moved from the optional path 621 to a required path 622. For example, node 604*a* is now node 604*b* and node 605*a* is now node 605*b*. Furthermore, the optinal path 621 has been removed from the diagram as well as two combiner nodes that connect the optional path 621 to the required path 622. The modified BPMN model 600B may be output on the user interface thereby enabling the user to see what changes to make to their process to align with current best practices in the industry.

Figure 7:
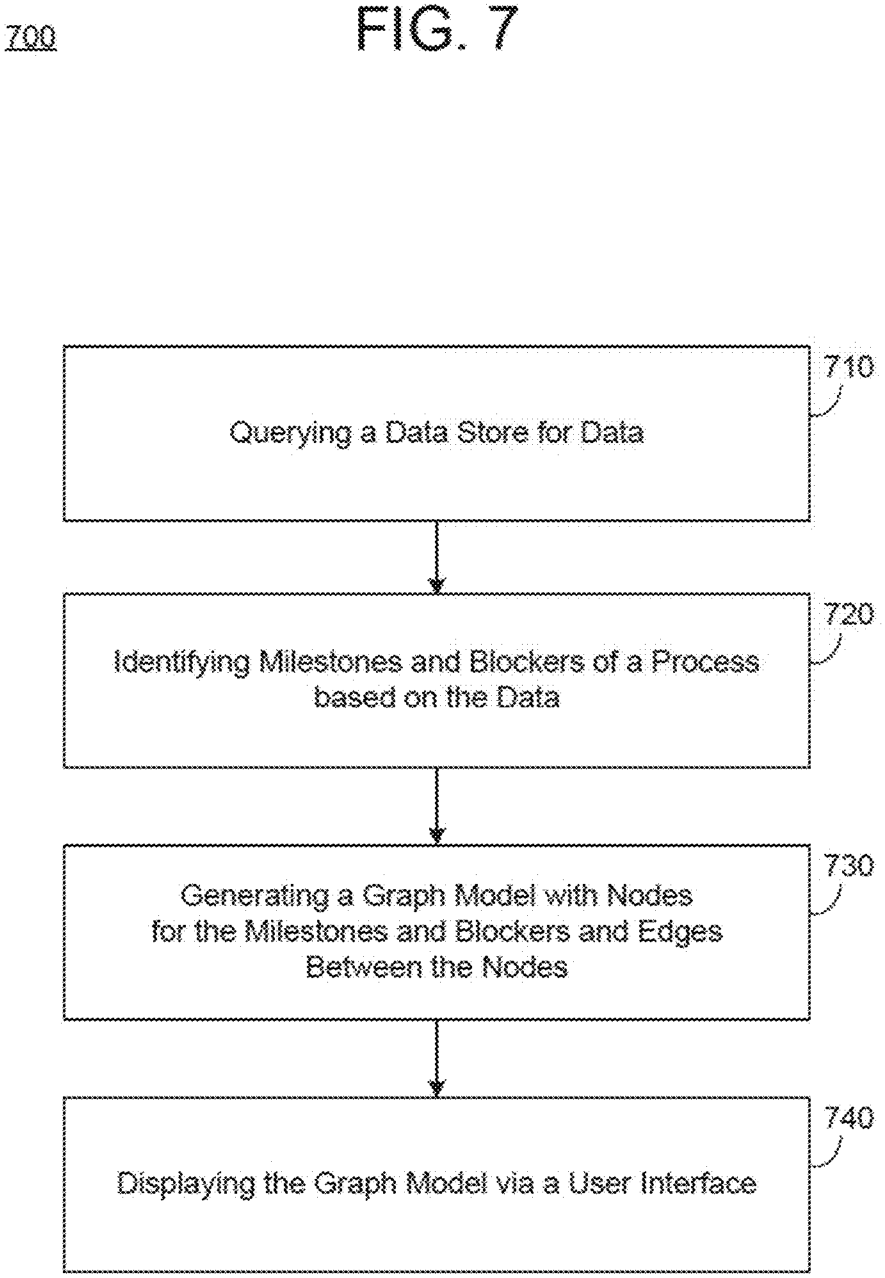
FIG. 7 is a diagram illustrating a method of generating a process graph based on process insights in accordance with an example embodiment.

FIG. 7 illustrates a method 700 of generating a process graph based on process insights in accordance with an example embodiment. For example, the method 700 may be performed by a software application hosted by a host platform such as a cloud platform, a web server, a distributed system, a database, or the like. Referring to FIG. 7, in 710, the method may include querying a data store for document data of a process. The document data may include invoice data, sales order data, receipts, and the like which are generated based on a customer's interaction with the process such as the customer using a website to purchase a product.

In 720, the method may include identifying a plurality of milestones that occur within the process and blockers that prevent at least one of the milestones from completing based on the document data. Milestones may correspond to standard events that similar business processes go through, for example, creating a sales order, generating an invoice for the sale, receiving payment on the invoice, clearing the invoice, etc. In 730, the method may include generating a graph model of the process based on a predefined template, wherein the graph model comprises a plurality of nodes corresponding to the plurality of milestones and edges between the plurality of nodes based on the blockers. In 740, the method may include displaying the graph model of the process via a user interface.

In some embodiments, the method may further include comparing the graph model of the process or the derived BPMN version thereof to a best practice model to identify a recommended node to add to the graph model of the process, and displaying information about the node to add via the user interface. In some embodiments, the identifying may include extracting data of a plurality of executions of the process from a database table, and generating a log of events of the plurality of executions of the process based on the plurality of process events and timestamps of the plurality of process events. In some embodiments, the identifying may further include identifying completion ratios of the plurality of milestones based on the log of events, and illustrating the completion ratios within the graph model displayed via the user interface.

In some embodiments, the plurality of executions of the process correspond to a plurality of respective front-end users executing the process via a software application. In some embodiments, the generating the log of events may include generating a plurality of event logs for the plurality of milestones, respectively, and storing data from the plurality of event logs in the plurality of nodes in the process graph, respectively. In some embodiments, the method may further include inferring a virtual event exists in the process based on the document data, and adding a node to the process graph based on the inferred virtual event. In some embodiments, the generating the graph model may include generating two or more nodes in the graph model for a milestone based on a blocker of the milestone.

Figure 8:
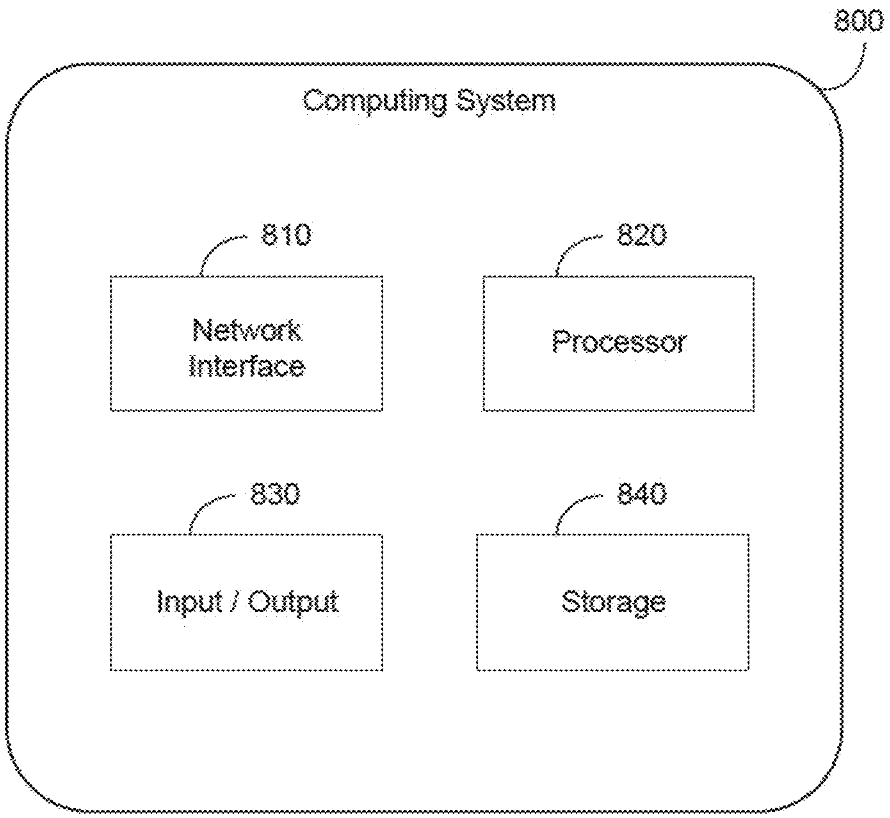
FIG. 8 is a diagram illustrating a computing system for use in the examples herein in accordance with an example embodiment.

FIG. 8 illustrates a computing system 800 that may be used in any of the methods and processes described herein, in accordance with an example embodiment. For example, the computing system 800 may be a database node, a server, a cloud platform, or the like. In some embodiments, the computing system 800 may be distributed across multiple computing devices such as multiple database nodes. Referring to FIG. 8, the computing system 800 includes a network interface 810, a processor 820, an input/output 830, and a storage 840 such as an in-memory storage, and the like. Although not shown in FIG. 8, the computing system 800 may also include or be electronically connected to other components such as a display, an input unit(s), a receiver, a transmitter, a persistent disk, and the like. The processor 820 may control the other components of the computing system 800.

The network interface 810 may transmit and receive data over a network such as the Internet, a private network, a public network, an enterprise network, and the like. The network interface 810 may be a wireless interface, a wired interface, or a combination thereof. The processor 820 may include one or more processing devices each including one or more processing cores. In some examples, the processor 820 is a multicore processor or a plurality of multicore processors. Also, the processor 820 may be fixed or it may be reconfigurable. The input/output 830 may include an interface, a port, a cable, a bus, a board, a wire, and the like, for inputting and outputting data to and from the computing system 800. For example, data may be output to an embedded display of the computing system 800, an externally connected display, a display connected to the cloud, another device, and the like. The network interface 810, the input/output 830, the storage 840, or a combination thereof, may interact with applications executing on other devices.

The storage 840 is not limited to a particular storage device and may include any known memory device such as RAM, ROM, hard disk, and the like, and may or may not be included within a database system, a cloud environment, a web server, or the like. The storage 840 may store software modules or other instructions which can be executed by the processor 820 to perform the methods described herein. According to various embodiments, the storage 840 may include a data store having a plurality of tables, records, partitions and sub-partitions. The storage 840 may be used to store database records, documents, entries, and the like.

According to various embodiments, the storage 840 may include a data store such as a database that is configured to store document data of a process. Meanwhile, the processor 820 may be configured to query the data store for the document data of the process. The processor 820 may use the queried data to identify a plurality of milestones that occur within the process and blockers that prevent at least one of the milestones from completing based on the document data. In some cases, a milestone may have multiple blockers. Furthermore, the processor 820 may generate a graph model of the process based on a predefined template, wherein the graph model comprises a plurality of nodes corresponding to the plurality of milestones and edges between the plurality of nodes based on the blockers, and display the graph model of the process via a user interface.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory medium.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising: a data store configured to store document data of a process; and at least one processor configured to:

query the data store for the document data of the process, identify a plurality of milestones that occur within the process and one or more blockers, at least a portion of the plurality of milestones and the one or more blockers being identified from a group of known milestones and blockers, each blocker of the one or more blockers comprising an occurrence or event which prevents at least one milestone from among the plurality of milestones from completing based on the document data, receive a user input comprising a selection of a subset of the plurality of milestones, extract data of a plurality of executions of the process from a database table, and generate a log of events of the plurality of executions of the process based on a plurality of process events within each execution from among the plurality of executions and timestamps of the plurality of process events, generate a graph model of the process based on a predefined template, wherein the graph model comprises a plurality of nodes corresponding to the subset of the plurality of milestones and the blockers, the graph model including directional edges disposed between various nodes of the plurality of nodes, each of the directional edges including an indication of an amount of process instances which follow a particular direction between two of the various nodes, and display, via a user interface, the graph model of the process.

2. The computing system of claim 1, wherein the at least one processor is further configured to compare the graph model of the process to a best practice model to identify node to add to the graph model of the process, and display a recommendation with information about the node via the user interface.

3. The computing system of claim 1, further comprising comparing the graph model to a best practice model to identify a node to recommend to add to the graph model, and displaying information about the node to a user via a user interface.

4. The computing system of claim 1, wherein the plurality of executions of the process correspond to a plurality of respective front-end users executing the process via a software application.

5. The computing system of claim 1, wherein the at least one processor is configured to generate a plurality of event logs for the plurality of milestones, respectively, and illustrate data from the plurality of event logs in the plurality of nodes in the graph model, respectively.

6. The computing system of claim 1, wherein the at least one processor is configured to infer a virtual event exists in the process based on the document data, and add a node to the graph model based on the inferred virtual event.

7. The computing system of claim 1, wherein the at least one processor is configured to generate two or more nodes in the graph model for a milestone based on a blocker of the milestone.

8. A method comprising: querying a data store for document data of a process;

identifying a plurality of milestones that occur within the process and one or more blockers, each individual milestone of the plurality of milestones comprising an event required to occur during the process, and each blocker of the one or more blockers comprising an occurrence or event which prevents at least one milestone from among the plurality of milestones from completing based on the document data;

receiving a user input comprising a selection of a subset of the plurality of milestones;

extracting data of a plurality of executions of the process from a database table, and generate a log of events of the plurality of executions of the process based on a plurality of process events within each execution from among the plurality of executions and timestamps of the plurality of process events;

generating a graph model of the process based on a predefined template, wherein the graph model comprises a plurality of nodes corresponding to the plurality of milestones and the blockers, the graph model including directional edges disposed between various nodes of the plurality of nodes, each of the directional edges including an indication of an amount of process instances which follow a particular direction between two of the various nodes; and displaying the graph model of the process via a user interface.

9. The method of claim 8, wherein the method further comprises comparing the graph model of the process to a best practice model to identify a node to add to the graph model of the process, and displaying a recommendation with information about the node via the user interface.

10. The method of claim 8, further comprising comparing the graph model to a best practice model to identify a node to recommend to add to the graph model, and displaying information about the node to a user via a user interface.

11. The method of claim 8, wherein the plurality of executions of the process correspond to a plurality of respective front-end users executing the process via a software application.

12. The method of claim 8, wherein the generating the log of events comprises generating a plurality of event logs for the plurality of milestones, respectively, and storing data from the plurality of event logs in the plurality of nodes in the graph model, respectively.

13. The method of claim 8, wherein the method further inferring a virtual event exists in the process based on the document data, and adding a node to the graph model based on the inferred virtual event.

14. The method of claim 8, wherein the generating the graph model comprises generating two or more nodes in the graph model for a milestone based on a blocker of the milestone.

15. A computer-readable medium comprising instructions which when executed by a processor cause a computer to perform a method comprising: querying a data store for document data of a process;

identifying a plurality of milestones that occur within the process and one or more blockers, at least a portion of the plurality of milestones and blockers being identified from a group of known milestones and blockers, each blocker of the one or more blockers comprising an occurrence or event which prevents at least one milestone from among the plurality of milestones from completing based on the document data;

receiving a user input comprising a selection of a subset of the plurality of milestones;

extracting data of a plurality of executions of the process from a database table, and generate a log of events of the plurality of executions of the process based on a plurality of process events within each execution from among the plurality of executions and timestamps of the plurality of process events;

generating a graph model of the process based on a predefined template, wherein the graph model comprises a plurality of nodes corresponding to the plurality of milestones and the blockers, the graph model including directional edges disposed between various nodes of the plurality of nodes, each of the directional edges including an indication of an amount of process instances which follow a particular direction between two of the various nodes; and displaying the graph model of the process via a user interface.

16. The computer-readable medium of claim 15, wherein the method further comprises comparing the graph model of the process to a best practice model to identify a node to add to the graph model of the process, and displaying a recommendation with information about the node via the user interface.

17. The computer-readable medium of claim 15, wherein the instructions which when executed by a processor cause a computer to further perform the method to compare the graph model to a best practice model to identify a node to recommend to add to the graph model, and displaying information about the node to a user via a user interface.

* * * * *